United States Patent [19]

Taft

[11] Patent Number: 4,794,844

[45] Date of Patent: Jan. 3, 1989

[54] PNEUMATICALLY OPERATED SERVO-BOOSTER

[75] Inventor: Philip A. Taft, West Midlands, England

[73] Assignee: Lucas Industries, Public Limited Company, Birmingham, England

[21] Appl. No.: 10,622

[22] Filed: Feb. 4, 1987

[30] Foreign Application Priority Data

Feb. 6, 1986 [GB] United Kingdom ............... 8602947

[51] Int. Cl.⁴ ............................................. F15B 9/10
[52] U.S. Cl. ................................. 91/376 R; 91/369.3
[58] Field of Search ............... 91/369 A, 376 R, 369 C

[56] References Cited

U.S. PATENT DOCUMENTS

| | | | |
|---|---|---|---|
| 4,286,501 | 9/1981 | Thomas et al. | 91/369 A X |
| 4,409,790 | 10/1983 | Seip | 91/369 A X |
| 4,417,500 | 11/1983 | Hayashida | 91/376 R X |
| 4,633,760 | 1/1987 | Wagner | 91/376 R X |
| 4,643,075 | 2/1987 | Wagner | 91/369 A |
| 4,665,800 | 5/1987 | Rossigno et al. | 91/376 R |

Primary Examiner—Robert E. Garrett
Assistant Examiner—Mark A. Williamson
Attorney, Agent, or Firm—Holman & Stern

[57] ABSTRACT

A pneumatically operated servo-booster has a housing divided by a movable diaphragm assembly into chambers (A, B), and a hub connected to the diaphragm and forming a vacuum valve seat for co-operation with a spring-loaded valve member. A valve element movable relative to the hub forms an atmospheric valve seat for co-operation with the valve member. A sleeve co-axial with but separate from the hub carries an abutment member which forms a fixed abutment for the valve seat when the sleeve is in abutment with the shoulder of the housing. When the seat abuts the member, co-operation of the vacuum valve seat with the valve member under the action of pressure in one of the chambers maintains the atmospheric valve in a position of readiness for activation of the booster. This arrangement contributes to increased sensitivity of operation.

19 Claims, 2 Drawing Sheets

PNEUMATICALLY OPERATED SERVO-BOOSTER

FIELD OF THE INVENTION

This invention relates to a pneumatically operated servo-booster, primarily for use in vehicle hydraulic braking systems for the purpose of providing power assistance in the actuation of a brake master cylinder.

DESCRIPTION OF THE PRIOR ART

Some conventional boosters designed for such use include a housing divided into two chambers by a movable diaphragm assembly. One chamber is subject to air pressure, which may be positive or negative, and valves actuated by movement of a driver-operated pedal control air flow to the other chamber such that the diaphragm is either balanced by equal pressures on either side thereof, or urged by pressure differential to provide power assistance for a braking operation.

It can happen in some boosters of this kind that, due to inevitable tolerances, considerable initial movement of the booster components takes place before actuation of the appropriate valve occurs, leading to unsatisfactory operation of the booster.

BRIEF SUMMARY OF THE INVENTION

An object of the present invention is to provide an improved booster in which the above problem is alleviated, resulting in sensitive operating characteristics.

According to the present invention, a pneumatic servo-booster comprises a housing providing a pair of chambers separated by a movable partition, a hub, or boss member movable with the partition and providing a first valve seat for co-operation with a valve member, a valve element movable relative to the hub member under the action of a force input member and providing a second valve seat for co-operation with the valve member, said co-operation between the valve seats and valve member occurring in dependence upon the relative axial positions of the two seats so as to control the balance of pressures in the two chambers, a hollow member generally co-axial with the hub and being separate from and movable relative to the hub, an abutment member movable with the hollow member and providing an abutment surface such that an extreme position of movement of the second valve seat relative to the valve member is determined by engagement of the valve element with said surface, the arrangement being such that, with the valve element so engaged, the first valve seat co-operates with the valve member under the action of the pressure in one of said chambers in such a manner as to maintain the second valve seat in a balanced condition of readiness for actuation by said force input member.

This arrangement enables the second valve seat to respond substantially instantaneously to inward force from the input member, thereby providing a booster of significantly improved sensitivity as compared with some prior art arrangements.

Preferably, the abutment member is fixed to and carried by the hollow member and said extreme position of movement of the second valve seat is conveniently dependent upon abutment of the hollow member against the housing.

Typically, said abutment surface is positioned adjacent the location of co-operation between the second valve seat and the valve member.

In one convenient arrangement, the valve member is urged towards the valve seats by a spring reacting against the abutment member. Preferably, the valve member and valve seats are disposed within the hollow member, the abutment member conveniently acting to retain the valve member within the hollow member. The abutment member additionally provides a reaction surface for the spring urging the valve member towards the valve seats.

BRIEF DESCRIPTION OF THE DRAWINGS

The invention will now be described, by way of example, with reference to the accompanying drawings wherein.

DETAILED DESCRIPTION

Figure 1:
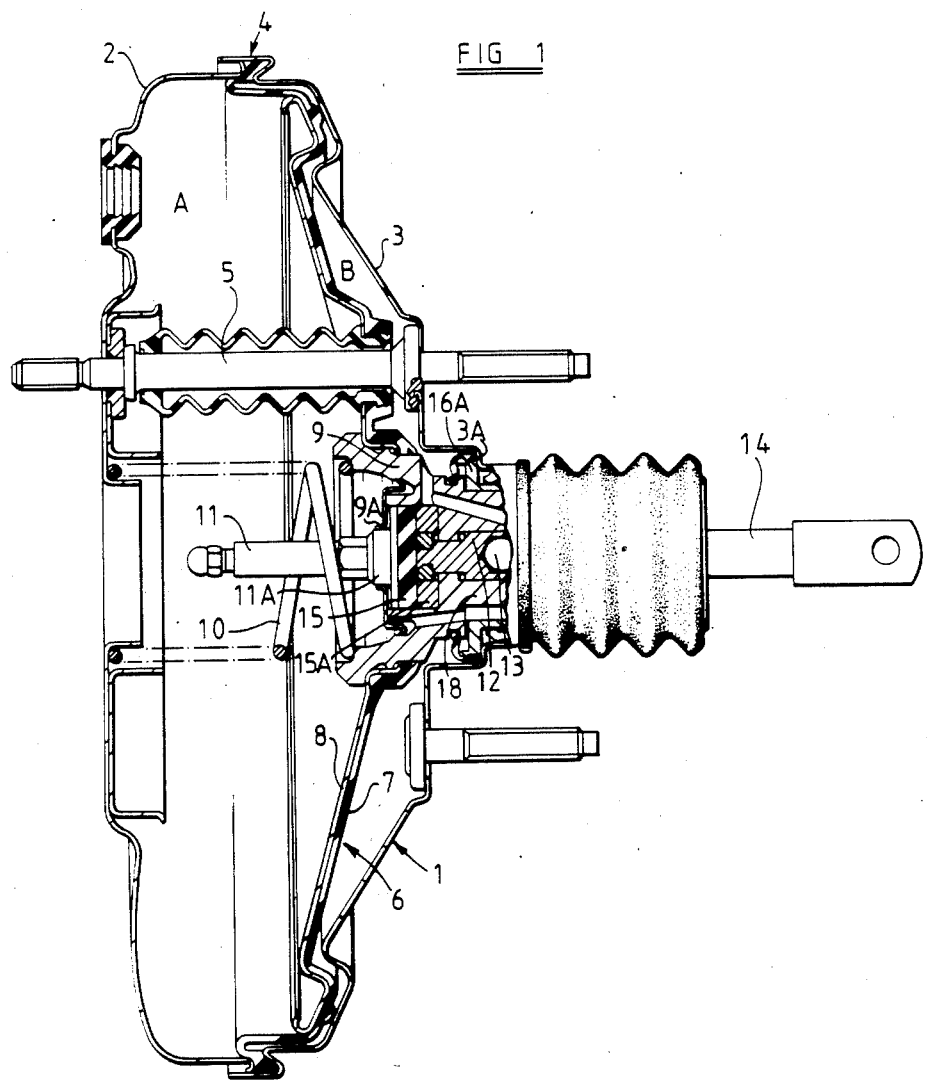
FIG. 1 is a longitudinal cross-sectional view of one form of servo-booster assembly of the invention.
Figure 2:
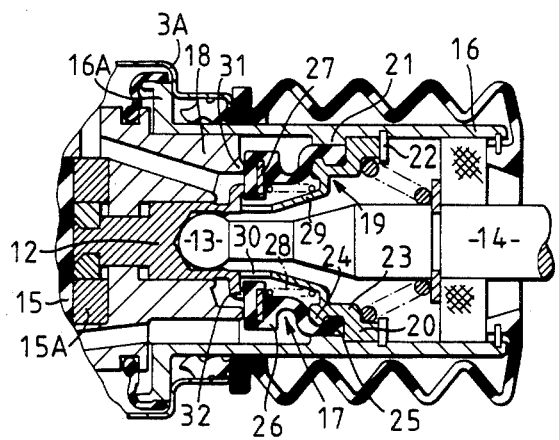
FIG. 2 is an enlarged cross-sectional view of part of the servo-booster of FIG. 1.

The servo-booster illustrated in FIGS. 1 and 2 of the drawings has a housing 1 composed of front and rear shells 2 and 3 which are joined around their outer peripheries at 4. The particular arrangement illustrated also includes ties 5, of which a number are arranged around the periphery of the housing and each of which extends between the shells 2 and 3 to afford additional support therefor and also to provide means for mounting the housing on a master cylinder flange and/or vehicle bulk head, in conventional manner.

The interior of the housing is divided into two chambers A, B by a diaphragm assembly 6 which includes a flexible diaphragm 7 and a relatively rigid diaphragm support plate 8, the diaphragm 7 being trapped around its outer periphery at the joint 4 between the housing shells 2 and 3. The backing plate 8 is supported in its central region on a central hub, or boss 9 which extends therethrough and which is urged to the right, as seen in the drawing, by a coil spring 10 acting between the boss and an internal surface portion of the shell 2. Retained within hub 9 by a resilient retainer 9A is a force output rod 11 which would be connected, in use, to a piston of a master cylinder (not shown) forming part of a vehicle hydraulic braking system. Also housed within hub 9 is a valve control piston 12 which is allowed limited axial sliding movement within hub and to which is crimped or otherwise secured a ball end 13 of a force input rod 14 connected, in use, to a driver-operated brake actuating pedal. A reaction disk 15 is interposed between the left-hand side of the piston 12, which is surrounded by an annular plate 15A, and an enlarged head 11A of the output rod 11.

Extending rearwardly from the housing 1 and co-axially with hub 9 is a housing extension in the form of a sleeve 16 which is separate from hub 9 and carries a poppet valve assembly, indicated generally at 17, the sleeve being afforded support by a rearwardly projecting co-axial extension 18 of hub 9 such that relative sliding movement can take place between the sleeve and boss. The sleeve 16 is provided with a radial flange 16A for abutment with an adjacent shoulder 3A of the housing 1.

The poppet valve assembly 17 is carried by an abutment member, indicated generally at 19, of which an enlarged end portion 20 is trapped securely between a shoulder 21 of the sleeve 16 and a circlip 22 mounted in a groove of the sleeve. The abutment member also includes a projecting cylindrical portion 23 which terminates in a shoulder 24 partially defining a recess within which is received a bead 25 forming part of a flexible poppet valve member 26 which contains a rigid annular plate 27 between which and the abutment member 19 acts a coil spring 28 to urge the poppet valve member 26 to the left, as seen in the drawing.

The abutment member 19 also includes a hollow portion 29, of which a cylindrical extremity 30 functions as a stop, in the manner to be described hereafter. It should be noted that the abutment member 19 very conveniently performs the multiple functions of retaining the valve member 26 and its spring 28, as well as the aforesaid stop function. The left-hand face of the valve member 26 co-operates with a seat 31 formed at the rearward extremity of hub 9 to provide a vacuum valve and also with a further seating 32 formed on the rearward extremity of the control piston 12 to form an atmosphere valve. As can be seen from the drawing, said extremity 30 is slotted or otherwise perforated to permit atmospheric air flow therethrough when the vacuum valve opens while the atmospheric valve is closed.

The booster of FIGS. 1 and 2 is illustrated in its rest position. As will be more fully understood from the following description, the vacuum and atmosphere valves 31, 32 have achieved a balanced condition such that, as soon as the brake pedal is applied to move the force input rod 14 inwardly, the piston 12 is substantially instantaneously moved to the left, opening the atmosphere valve 32 and thereby admitting air to the chamber B behind the diaphragm 7. This causes the diaphragm and attached hub 9 to move to the left, applying power assistance via the output rod 11 to an operative piston of a master cylinder with which the booster is associated, in use. When the brake pedal is released, the piston 12 moves rightwardly under the action of the reaction disc 15 into engagement with the valve member 26 so as to close once more the atmosphere valve 32. The piston 12 will also come into contact with the extreme left-hand end of the abutment sleeve 29 and this causes the retainer 19, together with the valve member 26 and the sleeve 16, with which the retainer is fast for axial movement, to move also to the right, opening the vacuum valve 31 and thereby allowing air pressure built up in the chamber B to decay past the vacuum valve and through the perforated extremity 30 of the abutment member 29 to vacuum. When the sleeve 16 has moved sufficiently far to the right that its flange 16A abuts the shoulder 3A of the casing 3, the rightwards position of the retainer 20 and therefore of the atmosphere valve 32 in engagement with the abutment surface of the retainer is fixed. Rightward movement of hub 9 continues, however, sufficient to close the vacuum valve 31 once more and in doing so urging the valve member 26 to the right against the resistance of the spring 28. This opens the atmosphere valve slightly, thereby re-admitting air to the chamber B. As a small pressure builds up in this chamber, the hub moves slightly to the left, tending to re-open the vacuum valve and simultaneously allowing the valve member 26 to move to the left also, tending to close the atmosphere valve. The balanced condition referred to above is thereby obtained and it is this which enables the atmosphere valve to be opened substantially instantaneously by a very small movement of the rod 14, in turn leading to extremely sensitive operation of the booster.

In the arrangement of FIGS. 1 and 2, the combined force of the diaphragm and input rod 14 are applied via the reaction disk 15 to the output rod 11 and it will be seen that the reaction disk is disposed effectively between the vacuum and air valves formed by the hub 9 and piston 12, which move in opposition. A result of this is that the compliant nature of the reaction disk 15 adds to the movement required of hub in order to apply the necessary force to the master cylinder piston via the force output rod 11. A solution to this problem can be achieved by applying the force of the hub return spring via the reaction disk, and preferably onto the force output rod itself.

Figure 3:
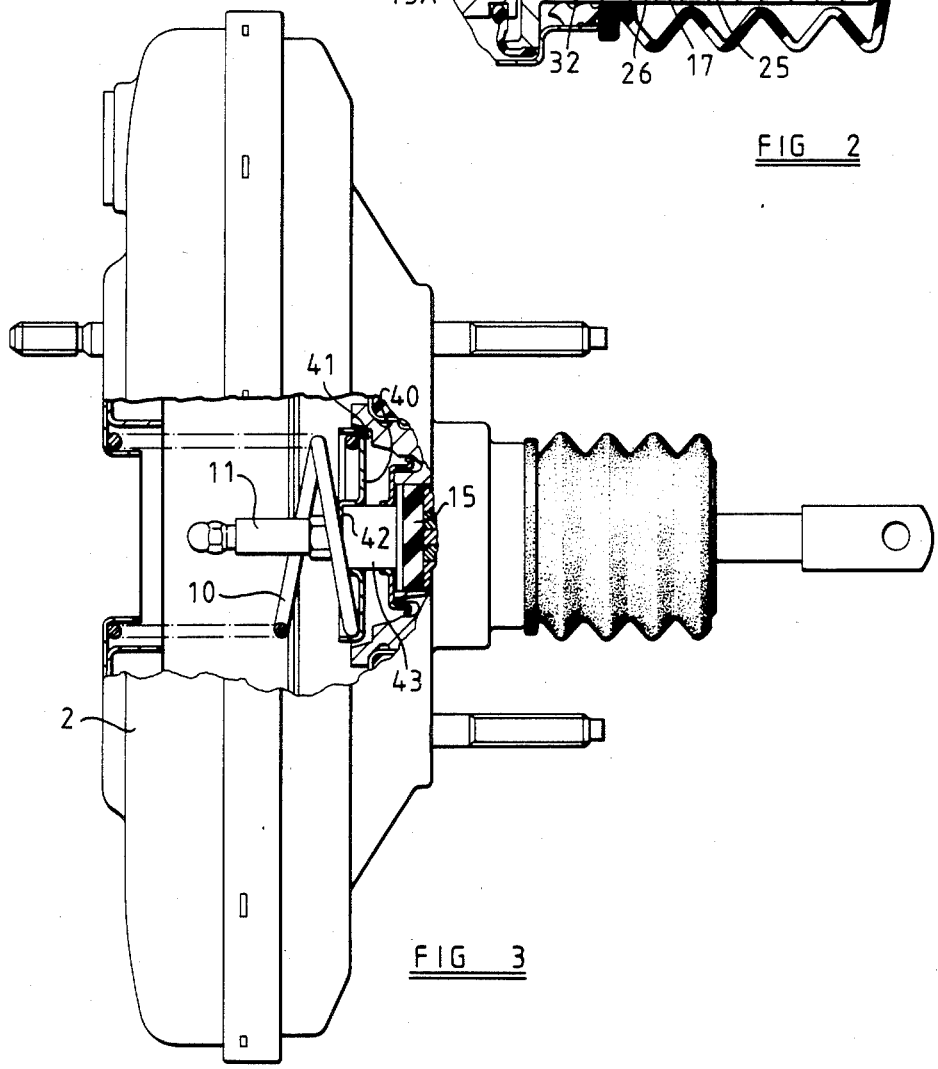
FIG. 3 is a side elevational view, partly in cross-section, of an alternative embodiment of the servo-booster of the invention.

An example of such an arrangement is illustrated in FIG. 3 in which the spring 10 now acts between the shell 2 and a cup member 40 which fits freely within a recess 41 of hub 9 and is shaped to form a reverse recess 42 which receives an enlarged portion 43 of the aforesaid rod 11. It will be seen that, by this means, the force of the spring 10 is applied directly via the rod 11 to the reaction disk 15. By careful choice of the material of the reaction disk and force of the spring 10, a degree of compression can be imparted to the reaction disk which lessens the excess hub movement but retains sufficient compliance to provide the necessary relative movement between the hub 9 and piston 12. Used in conjunction with the balanced valve arrangement of FIGS. 1 and 2 this feature of FIG. 3 can further contribute to the increased sensitivity of the booster.

I claim:
1. A pneumatic servo-booster comprising:
a hollow housing;
a movable partition in said housing forming two chambers in said housing separated by said partition;
a hub member movable with said partition;
a first valve seat on said hub member;
a valve element movable relative to said hub member and engaged with a force input member for movement thereby;
a second valve seat on said valve element and having relative axial positions with respect to said first valve seat;
a valve member yieldably urged toward an operative position in cooperative engagement with said valve seats, cooperation of said valve seats with said valve member being dependent upon said relative axial positions of said valve seats for controlling pressures in said two chambers;
a hollow member separate from and substantially co-axial with and movable relative to said hub;
an abutment member movable with said hollow member;
an abutment surface on said abutment member directly engageable with said valve element for determining an extreme position of movement of said second valve seat relative to said valve member;
so that when said valve element is engaged against said abutment surface, movement of said hub by pressure in one of said chambers causes said first valve seat to move said valve member relative to said second valve seat for maintaining said second valve seat in a balanced condition of readiness for actuation by said force input member.

2. A servo-booster as claimed in claim 1 wherein said abutment member is fixed to and carried by the hollow member.

3. A servo-booster as claimed in claim 2 wherein said hollow member is movable relative to and abuttable against said housing and said extreme position of movement of said second valve seat is dependent upon abutment of said hollow member against said housing.

4. A servo-booster as claimed in claim 3 wherein said abutment surface is positioned adjacent the location of engagement between said second valve seat and said valve member.

5. A servo-booster as claimed in claim 4 wherein said valve member is urged towards said valve seats by a spring reacting against said abutment member.

6. A servo-booster as claimed in claim 5 wherein said valve member and valve seats are disposed within said hollow member.

7. A servo-booster as claimed in claim 6 wherein a reaction surface is provided on said abutment member engaging said spring urging the valve member towards the valve seats.

8. A servo-booster as claimed in claim 7 wherein said force imput member comprises a rod having an abutment thereon, and a return spring is provided between said abutment on said rod and said abutment member.

9. A servo-booster as claimed in claim 8 wherein the force of a return spring for said hub acts through a reaction disc disposed between said force input member and a force output member carried by said hub.

10. A servo-booster as claimed in claim 9 wherein said hub return spring acts between said housing and said force output member.

11. A servo-booster as claimed in claim 1 wherein said hollow member is movable relative to and abuttable against said housing and said extreme position of movement of said second valve seat is dependent upon abutment of said hollow member against said housing.

12. A servo-booster as claimed in claim 1 wherein said abutment surface is positioned adjacent the location of engagement between said second valve seat and said valve member.

13. A servo-booster as claimed in claim 1 wherein said valve member is urged towards said valve seats by a spring reacting against said abutment member.

14. A servo-booster as claimed in claim 13 wherein a reaction surface is provided on said abutment member engaging said spring urging the valve member towards the valve seats.

15. A servo-booster as claimed in claim 1 wherein said valve member and valve seats are disposed within said hollow member.

16. A servo-booster as claimed in claim 15 wherein said abutment member retains said valve member within the hollow member.

17. A servo-booster as claimed in claim 1 wherein said force input member comprises a rod having an abutment thereon, and a return spring is provided between said abutment on said rod and said abutment member.

18. A servo-booster as claimed in claim 1 wherein the force of a return spring for the hub acts through a reaction disc disposed between said force input member and a force output member carried by the hub.

19. A servo-booster as claimed in claim 18 wherein said hub return spring acts between said housing and said force output member.

* * * * *